United States Patent

[11] 3,620,778

[72] Inventor  Jacque C. Morrell
                8 Oxford St., Chevy Chase, Md. 20015
[21] Appl. No. 860,164
[22] Filed     Sept. 17, 1969
[45] Patented  Nov. 16, 1971
               Continuation of application Ser. No.
               678,208, Oct. 26, 1967, now abandoned,
               which is a continuation-in-part of
               application Ser. No. 494,971, Oct. 11,
               1965, now abandoned. This application
               Sept. 17, 1969, Ser. No. 860,164

[54] METHOD OF MAKING DENTAL IMPRESSION AND DENTAL STONES HAVING SMOOTH SURFACES
     12 Claims, No Drawings
[52] U.S. Cl. ..................................... 106/35,
                         106/271, 260/17.4, 260/29.6 S
[51] Int. Cl. ........................................ C09k 3/00
[50] Field of Search ............................. 106/35,
                         270, 271; 260/29.65, 9, 17.4; 32/17–19

[56]             References Cited
              UNITED STATES PATENTS
2,348,756   5/1944   Ryan ............................  260/23
2,557,083   6/1951   Eberl ...........................  260/29.6
2,745,813   5/1956   Logemann et al. ...........  260/29.6
2,816,843  12/1957   Erickson .......................  106/35
2,824,811   2/1958   Erickson et al. ..............  106/38.35
2,996,432   8/1961   Modderno .....................  167/90
3,234,033   2/1966   Morrell ........................  106/35
3,246,998   4/1966   Higashi et al. ................  106/35
3,268,348   8/1966   Morrell ........................  106/35
              FOREIGN PATENTS
  796,807  10/1968   Canada ........................  260/29.6
  635,486   4/1950   Great Britain ................  260/29.6

Primary Examiner—Donald J. Arnold
Assistant Examiner—John H. Miller

ABSTRACT: Aqueous suspensions of polymeric organic substances of the class having elastomeric and plastic properties are added to conventional dental casting compositions containing calcium sulfate, an alginate dispersed in water and an inorganic filler for the purpose of producing nonchalky surfaces on dental impressions, casts, and models.

METHOD OF MAKING DENTAL IMPRESSION AND DENTAL STONES HAVING SMOOTH SURFACES

This application is a continuation of Ser. No. 678,208 filed on Oct. 26, 1967 and now abandoned which was a continuation-in-part of application Ser. No. 494,971 filed on Oct. 11, 1965 and now abandoned.

This invention relates to dental impression materials and more particularly to those of the alginate type. More particularly, the present application relates to improvements described in the aforementioned application as well as the prior art generally wherein the alginate compositions are modified by the addition to the impression compositions on the one hand and/or to the dental stone or plaster of Paris compositions on the other hand (used to make the cast from the impression) of emulsions or suspensions generally of natural and synthetic resins or plastics generally and/or of elastomers including synthetic and natural rubbers, silicones, and the like. The purpose of adding these organic polymerlike materials is to impart their properties of elasticity, smoothness, etc., to the surface of the impression and/or the cast as hereinafter described.

A primary objective is to produce compositions which provide dental impressions possessing smooth surfaces and the qualities of elasticity and resilience as well as rigidity and toughness or strength so balanced that precision dental impressions may be made and removed from undercuts without rupture or permanent deformation. A specific requirement in dentistry in making dentures, both full and partial, as well as bridges, is accurate dental reproduction with maximum comfort to the patient, and this is also a general objective of may invention.

It is among the further objectives of this invention to produce models or casts from such impressions that possess hard smooth surfaces free from chalkiness and dusting in handling during use of the same or in storage.

Another important objective of my invention is the production of a dental impression composition which is readily wetted and mixed with water to a smooth consistency with controlled setting time.

An overall objective with alginate dental impression compositions is that they have long storage and shelf life, that is, minimum or no deterioration with age during use and normal exposure to atmospheric conditions including warm and humid conditions.

Moreover the impressions made from modern alginate compositions require no fixing or after treatment in special solutions or baths which involve additional time and material and increased cost generally. The fixing operation refers to treatment of the impression after it has been made. In the earlier developments and until comparatively recently, this operation was necessary before pouring or applying the dental "stone" (generally a composition containing some form of plaster of Paris) to the impression to make a satisfactory model or cast. The fixing baths consisted of aqueous solutions of various inorganic salts and these materials, as well as the time and cost, are eliminated by the use of my composition.

Among the essential ingredients or components of alginate compositions, e.g. in connection with my invention in its major or primary aspect are (a) the alginates especially the water soluble types such as the potassium, sodium or ammonium alginates; (b) calcium sulfate preferably in the dihydrate form, although the anhydrous and hemihydrate types also give good results; and (c) I also as a principal feature of my invention make use of my improvements in connection with alginate and calcium sulfate compositions containing certain selected fluorides (including all those found suitable in the prior art), e.g., potassium and sodium alginates particularly when combined with calcium sulfate and a fluoride in the impression mixtures as described in the prior art as well as such alginate compositions containing other additives besides fluorides, e.g., fluorosilicates of the prior art. In this connection I may also employ such compositions containing the fluorides of magnesium, aluminum, lithium, barium and stabilized zinc fluoride and others alone or in combination with each other including the various modifications referred to in my issued patents. The use of these fluorides together with metal oxides, hydroxides having a basic or alkaline reaction and of low water solubility generally and other additives is also contemplated by me. The amounts of the fluoride and other additives are from about 1 percent to 10 percent.

The use of the fluorides and fluosilicates as additives is nonequivalent both in properties and specific results. They do however obviate the necessity of using fixing baths generally consisting of water solutions of various inorganic salts to treat the impression and result in producing harder and cleaner surfaces on the plaster or "stone" model as well as improved operating control.

The calcium sulfate present reacts with the water soluble alginates to form an elastic and resilient impression base on the one hand and it also reacts with the fluorides to form the insoluble calcium fluoride. The specific reactions and interreactions of these essential materials and those disclosed herein generally appear to be a prime requirement to produce the superior results I obtain, and to meet the foregoing objectives. In addition to these essential ingredients, the use is made of retarders, generally salts of an alkaline character such as tetrasodium pyrophosphate to control the rate of the reactions and to prevent premature setting; and I also make use of fillers such as diatomaceous earth (and other generally inert and water insoluble materials), for bulk and as a diluent of the more active ingredients. All of the materials are thoroughly mixed and in a finely divided state of subdivision, and when it is desired to use the resulting composition, it is admixed with water in proper proportions to form the impression, the details of which are fully described in my issued patents and hereinafter. These and other aspects of alginate compositions in connection with my invention will be discussed and set forth more fully below, in connection with the present improvements.

It is especially noted that my improvement in the addition of organic plastic and/or elastomeric polymeric materials relates not only to the dental impression mixtures of alginate composition generally but also to improvements as additives to the plaster of Paris or stone compositions used to make models and casts and that it has wide application generally in this and comparable molding processes although its use in the dental art is the preferred one; also, I may employ various types of impressions.

The soluble salts of alginic acid (which is the essential gel forming material in various marine algae or plants), especially the potassium, sodium and ammonium alginates or mixtures of the same are suitable for my invention. The commercial product known as "Improved Kelmar" has been found very satisfactory. Calcium sulfate particularly in the form of the hemihydrate ($CaSO_4 \cdot \frac{1}{2}H_2O$) and preferably the dihydrate ($CaSO_4 \cdot 2H_2O$) may be employed. The soft soluble alginate is converted into the resilient and elastic insoluble type in an aqueous medium by interaction with calcium sulfate. The retarder which controls the rate of setting of the impression mixture may comprise a salt having an alkaline reaction generally such as sodium carbonate or trisodium orthophosphate or meta phosphate but I prefer the tetrasodium pyrophosphate for this purpose. With regard to the fillers, diatomaceous earth is preferred (e.g., the commercial product referred to as Hyflo-Super-Cel). However, other substantially inert and water insoluble materials such as calcium fluoride, carbonate or triphosphate, or the corresponding compounds of magnesium and barium (including barium sulfate), as well as various finely divided earths and minerals, e.g., bentonite, talc, kaolin, etc., and various silicates such as those of the alkaline earth metals and those of aluminum and the heavier metals, e.g., lead silicate, and water insoluble oxides such as aluminum oxide, may be used alone or in admixture with the diatomaceous earth, or with each other.

As one of its principal aspects and as a major feature of my novel impression mixtures, use is made of one or more of the fluorides mentioned by me in the applications referred to above as well as in the prior art generally. Other additives and various components of the mixtures are contemplated in connection with my invention.

The principal reaction of calcium sulfate present in the mixture with the soluble alginate has already been referred to. The reactions which may occur between the calcium sulfate and the fluorides of the alkaline earth metals may be explained as follows:

Calcium sulfate is soluble in water to the extent of 0.2 percent, and the fluorides of magnesium, barium and lithium are dissolved to the extent of 0.009 percent, 0.16 percent and 0.27 percent, respectively; and zinc fluoride is 0.005 percent soluble. However calcium fluoride is soluble in water only to the extent of 0.002 percent, and the free calcium and fluoride ions furnished by the calcium sulfate and the various metal fluorides respectively are considerably in excess of the concentration required to precipitate them as calcium fluoride. The reaction thus goes forward until one or the other reactants is exhausted. It is thus noted that even with such a small concentration of fluoride ions as those furnished by the relatively insoluble magnesium fluoride will cause precipitation of the even less soluble calcium fluoride. Various combinations of these fluorides or other fluorides or combinations thereof, e.g., a compound or mixture of an alkali fluoride and zinc fluoride may also be used in connection with my present invention as described above.

Whatever may be the explanation of the reaction in an aqueous medium or sequence of reactions in the mixture in relation to the physical properties of the impression and the "stone" model or cast made from the same, the result is an impression which is smooth and accurately defined and may be readily removed without breakage or distortion. Moreover, the model or cast made from these impressions may be of a high degree of precision and part cleanly from the latter without adhesion and have good nondusting and nonchalking surfaces of a highly superior type. However, I have found that both the precision of the impressions and their quality as well as that of the surfaces of the cast are greatly improved by my invention, described in further detail below.

Having described as illustrations the various materials which may be employed generally in connection with my invention, and pointed out certain variations in the practice, I shall proceed to show more particularly the steps of the process of its applications together with the preferred materials and their preparation to obtain best results.

Reverting to the manner in which my impression mixtures may be used and to the most suitable proportions for their use: The ingredients or components of the compositions of my impression mixtures which I have referred to above as preferred materials, i.e., the soluble alginate, e.g., potassium alginate (a suitable form is Improved Kelmar), calcium sulfate dihydrate; the retarder, tetrasodium pyrophosphate; one (or a combination of) the fluorides referred to above, e.g., magnesium fluoride; the alkaline oxide (when used), e.g., magnesium oxide, and the filler, diatomaceous earth (e.g., Hyflo-Super Cel).

All of the materials should be in finely divided form, and thoroughly mixed. On a generalized basis, the proportions of materials may vary considerably. Satisfactory results may be obtained with the following illustrations of range and intermediate compositions shown for convenience in parts per 100 parts by weight or percent.

TABLE I

| Material | Parts by weight or percent | |
|---|---|---|
| | Range | Intermediate composition |
| Potassium alginate | 12-15 | 13.5 |
| Calcium sulphate dihydrate | 12-14 | 12.5 |
| Retarder—Tetrasodium pyrophosphate [1] | 1-5 | 2.2 |
| Fluoride | 2-5 | 4.3 |
| Alkaline earth oxide [1] (e.g., MgO) | 0-5 | 1.5 |
| Filler—Diatomaceous earth | 73-56 | 66.0 |

[1] Amount depends on type and amount of fluoride.

Variations in the proportions of ingredients dependent on type and the amounts of the other components may be used on an even wider basis than shown in the table, which is for illustrative purposes only. Other illustrations may be found in the prior art on alginate impression compositions including my issued patents in connection therewith. The present invention is an improvement on all of these as hereinafter described.

In the production of the dental impression materials, all components or ingredients may be reduced to finely divided or powdered form and sieved to about 80 mesh in size, or finer. After mixing in a suitable type of mechanical mixer (such as a rotary helicoid ribbon type or double cone or other efficient tumbling type) the lumps may be broken down by passing through a coarse mechanical sieve. At this stage, the material is ready for packaging and distribution for use. Flavoring or coloring material may be introduced after mixing with a small amount of diatomaceous earth, calcium or magnesium carbonate or magnesium oxide.

When used by the dentist, the impression material prepared as described is mixed with water generally at room temperature to consistency of a somewhat heavy, smooth, creamy paste like material. Spatulation of the wet mixture may take place in about ½ to 1 minute, and it is then transferred to the tray to be applied to the mouth. Generally, the latter operation takes place in about a minute or a minute and a half, and the material is allowed to set for about 3½ to 4 minutes in the mouth; the whole operation consuming about 5 to 6 minutes. The proportion of water used is about 10 to 10.5 grams of the powdered impression mixture to about 25 cc. of water, or generally a ratio of 2.5 parts of water to 1 part of the powdered material. All of these data are illustrative only of materials used and proportions thereof. Also the above data on use may vary somewhat, those shown being illustrative of satisfactory conditions for good results.

The temperature of the water, as well as the room temperature, though not critical, may have a very appreciable effect on the setting time, decreasing with increase in temperature and vice versa. This is in accord with effect of temperature generally on reaction rates. Generally room temperature, depending on individual taste, varies between about 68° F. and 74° F. and this is a satisfactory working range, although good results may be obtained in a somewhat wider range with minor adjustments.

Any suitable dental "stone" (generally a plaster of Paris composition) of which there are a number available, made up to proper consistency with water, may be employed in making the "stone" cast or model. The latter, with the use of my invention, are hard, smooth and durable, especially in connection with the improved aspects of my invention as described below.

The important aspect of my invention which I have made in the field of improving the impressions as well as the casts is the addition of relatively small amounts of emulsified or dispersed organic polymeric materials, synthetic resins, and elastomeric substances such as polyvinyl acetate, polystyrene, polyvinyl chloride and vinylchloride-acrylate and vinylchloride-vinylacetate copolymers and dispersions of synthetic rubbers and elastomers such as butadiene-styrene, butadiene-acrylonitrile, polybutadiene, polyisoproprene, polyisobutylene, fluorocarbons, and silicones, and others on a nonequivalent basis either to the impression mixtures described above or to the dental stone composition (generally a plaster of Paris composition) with which the cast is made; or to both compositions.

Further in connection with my improvement I may add from about 1 percent to about 10 percent more or less (and preferably from about 1 percent to about 5 percent) of an aqueous suspension for example in the form of an emulsion or a dispersion, averaging for example about 50 percent of the suspended material, i.e., a range from about 0.5 percent to about 5 percent of the latter, generally of a finely divided polymeric organic, or an elastomeric or a plastic material dispersed in water (a) to the powdered or finely divided dental impression materials generally after admixture of the latter with water as described above or alternatively (b) to the powdered or finely divided plaster of Paris or "stone" after admixture with water when used to make the cast. In both cases the amounts of the emulsion added is based on the combined weight of the dry material and the water to be added. NOrmally the emulsion may be added to the mixture of water and dry material, but in some cases it may be added to the water before admixture. The amount of suspended material in the emulsion or suspension may vary over a wide range within the limits shown.

The polymeric organic material of an elastomeric or plastic character may be one or a mixture of a very wide variety of materials available in the field usually of a finely divided solid or semisolid form which I shall describe at some length below in order to make clear the various types which I may use in connection with my invention.

With regard to the materials I employ as additives to the impression mixtures they are generally an organic polymeric substance of an elastomeric or plastic character and may include compounded and processed raw polymers containing plasticizers and similar additives.

The term elastomer has a broader meaning than the term rubber in that the former while exhibiting elasticity need not return relatively rapidly to approximately its original dimension when stretched. Rubbers are however included in the broader classification of elastomers, i.e., polymeric materials which exhibit well-defined elasticity. It is of course to be understood that some polymers as such may become elastic only by compounding and processing. Rubbers may be plastic in the raw stage so that they may be readily formed but unlike materials which are substantially permanently thermoplastic, rubber may be altered by vulcanization or curing so that it will retain dimensions and shape while at the same time possessing extensibility and flexibility. There are a number of compounded plastics which possess certain properties of rubber such as elongation (which includes flexibility and extensibility) but to the extent: (a) that they cannot be vulcanized or cured, (b) or do not possess the property of return to substantially original shape or size on being stretched or deformed, (c) or do not possess substantial tensile strength or a low brittle or freezing point they cannot be called rubbers although the property of elongation may place them in the class of elastomers. All of these materials are useful in some degree in my invention.

In some cases where the values of all of the required properties are present in two or more compatible materials and are not canceled out they may be blended with each other, i.e., I may employ various mixtures of elastomeric or plastic materials which in general may be organic polymeric substances.

In order to further clarify certain aspects of my invention it is desirable to define and differentiate certain other classes of materials referred to as plastics which in general may be considered organic compound polymers. Plasticity is the property of a solid body (in the present case of organic chemical polymeric compounds), whereby it undergoes a permanent change in shape or size when subjected to a stress exceeding a particular value called the yield value. Thermoplastic materials in this class retain their ability to be repeatedly formed (or deformed) by pressure and heat, while thermosetting materials lose this property when once subjected to the heat and pressure required for forming by setting up into a hard rigid solid which is no longer plastic as defined above. Of these two classes, the thermoplastics are preferred. Also as noted above some of these normally plastic materials may be converted into elastomers (by processing and compounding) and may resemble rubbers from the viewpoint of elasticity but unlike the latter cannot be cured or vulcanized. Some of these have been referred to as elastoplastics and are useful in my invention. Rubbers are thermoplastic during forming operations but are vulcanized or cured to an intermediate "rubbery" state (discussed above) after forming that is usually highly elastic but retains its form. However in some cases the cure may be carried to the stage where a rigid material resembling thermosetting materials is formed, and while useful, these types are not preferred by me.

There are a large variety of elastomeric and plastic materials which include natural and synthetic rubbers as well as synthetic resins which are suitable for use in my invention. Among the latter class, I may mention as examples the condensation thermoplastic polymers including the phthalic acid or maleic anhydride "adduct" condensations with glycerol and linoleic acid. In addition to the condensation polymers shown for illustration only, there are also for illustration a wide variety of polymers and copolymers including those of polyvinyl acetate, polyvinyl chloride, the polyester acrylates, and the elastomeric polymerized hydrocarbons and synthetic rubbers hereinafter referred to. In addition there are the plastics from cellulose and various combinations. The polyesters of acrylic acid and of methacrylic acid and the polyacrylic resins generally as well as plasticized polystyrene, etc., show elastic properties and may be termed elastoplastics. The elastomeric urethanes may also be included in the groups of elastoplastics and may be employed in connection with my invention. All of these and the others shown may be used on a selective basis suspended or emulsified in an aqueous medium in connection with my invention.

There are several extensive classifications of commercial resins and polymers for example that shown by Winding and Hiatt (Polymeric Materials, McGraw Hill, 1961, pp. 17 and 18, table 1—1). These are divided into five principal classes which in turn are divided into numerous groups or subclasses of the same:

I. Derivatives of Natural Products
   A. Natural Resins
   B. Cellulose Derivatives
   C. Rubber Derivatives
II. Resins formed by condensation polymerization
   A. Phenolic Resins
   B. Amino Resins
   C. Polyesters
   D. Urethanes
   E. Polyamides
   F. Epoxies
   G. Polyesters
III. Ethenic polymers
   A. Polyethylene
   B. Polypropylene
   C. Polyisobutylene
   D. Fluorocarbon polymers
   E. Polyvinyl acetate and its derivatives
   F. Vinylchloride polymers and copolymers
   G. Polyvinylidene chloride
   H. Polystyrene
   I. Acrylic polymers
   J. Coumerene-indene polymers
   K. Polyvinyl ethers
   L. Polyvinyl ketones
   M. Polyvinyl amines
   N. Divinyl polymers
IV. Silicones
V. Rubbers.

Group V which includes the rubbers will be discussed in detail below. The divisions shown above include only the headings or titles of the individual group included within the divisions and the latter may in turn be subdivided. It is therefore to be understood that these are for illustration only, but they show the broad class form which I may make suitable selections. Those having elastomeric or elastoplastic properties are preferred.

Synthetic rubbers which generally have low brittle points may be used in connection with my invention. One classification of the principal types is shown in the following table (Winding & Hiatt (loc. cit., p. 381)):
   I. Polyisoprene Synthetic Rubber (IR)
(may also include natural rubbers)
II. Polybutadiene (BR)—of various types
III. Polychloroprene (CR)
IV. Butadiene Copolymers
  A. SBR (GRS) (1) Hot Rubbers (2) Cold Rubbers
  B. Nitrile Rubbers (NBR) With varying amounts of acrylonitrile to vary oil resistance
V. Isobutylene—isoprene copolymers (IR) With varying amounts of isoprene
VI. Polysulfide rubbers
  A. High mol wt. linear
  B. Moderate mol wt. branched
  C. Liquid Polymers
VII. Chlorinated polyethylene
VIII. Polyurethane Rubbers
IX. Silicone Rubbers
X. Polymers containing fluorine It is noted that a considerable number of materials with elastomeric properties is mentioned aside from the rubbers. These especially include elastomeric polymers which the Fisher classification refers to as Elastolenes and which are in Group III (table 1) in the Winding & Hiatt classification as Ethenic polymers including polyethylene, polypropylene and polyisobutylene which cannot be vulcanized, but have properties similar to unvulcanized rubber with respect to elasticity, especially, and may therefore be utilized in my invention.

Polyisobutylene may be prepared as liquids as well as rubbery semisolids and solids which are useful in my invention. One well known commercial product is vistanex. It resembles rubber in swelling and dissolving in low-boiling solvents like rubber. It has a low brittle point and very good elongation. Unlike rubber it has a poor rebound at room temperature and cannot be vulcanized due to the lack of double bonds. Polyethylene (low density) has good elongations and high tensile strength. It likewise cannot be vulcanized. Polypropylene has elongation comparable to polyethylene, but is much higher in tensile strength comparable to vulcanized rubber. Of the two latter polyethylene is preferred for my invention.

All of these elastomeric compounds are generally hydrocarbon in composition. Two hydrocarbon rubberlike materials which are more closely related in a sense as true synthetic rubbers to natural rubber are polyisoprene and polybutadiene. Since they contain double bonds they may be vulcanized like natural rubber. These likewise may be utilized in connection with my invention. All of these organic polymeric materials are useful alone, in combination with each other, or with the other plastic or elastomeric materials mentioned above.

Among the polyesters which are elastomeric and are useful in connection with my invention referred to in subgroup C (Polyesters) of Group III of the Winding & Hiatt classification are the polyacrylic esters which are made by the polymerization of the esters of acrylic acid and the alcohols. Reaction temperatures are relatively low and polymerization is effected by the use of heat alone or by the use of very small amounts of catalysts. Intermediate viscous fluids to thermoplastic semisolid to solid rubbery products are produced. The latter have good elongation and tensile strength. These materials may be utilized in my invention as such or in combination with other materials.

Other materials in the classification sometimes referred to as elastoplastics have elastomeric properties most of which are what Fisher refers to as elastoplastics. These in general are of secondary value in connection with my invention compared to the rubbers. Those materials in general which possess substantially elastomeric properties may be used alone or by blending with other materials.

Among cellulosic elastoplastics of interest is ethyl cellulose, which is soluble in many organic liquids and is compatible with a large number of commonly used plasticizers (e.g., tricresyl phosphate, dibutyl phthalate, dibutyl sebacate and others), and with cellulose nitrate. It has a high tensile strength and good elongation and is flexible at low temperatures. It is heat stable and converts to rubberlike material on working. Cellulose acetate butyrate likewise shows good properties of high tensile strength and fairly good elongation. It is compatible with various other materials.

Among the polyvinyl compounds, most of them like polyvinyl chloride, polyvinylchloride-acetate, polyvinylidene chloride show good tensile strengths and elongation when plasticized and are useful in connection with my invention. The same is true as noted above of the halogenated (chlorine and fluorine) natural and synthetic rubbers generally. Polyvinyl butyral has some value as a blending agent, or as such, especially since it retains its flexibility at low temperatures. It has good solubility in low boiling solvents and is useful in blending.

The true thermosetting polymers including the phenol formaldehydes, the urea formaldehydes and the melamine formaldehydes and others are generally low in elongation or elasticity and generally cannot be plasticized and are therefore not useful as such in connection with my invention.

In addition to making mixtures of various compatible materials to complement and supplement the necessary properties of high elasticity and tensile strength and low brittle point, it is also desirable to select the components of such mixtures on the basis of improving the processing and the characteristics of my novel impression mixtures.

In addition to selection of single types of polymeric materials already described, or of mixtures of the same it may be desirable to make copolymers and interpolymers of the monomers from which the polymers are made; or of reacting the polymers while in an intermediate stage with each other, all directed to facilitating the production of a superior end product, and the use of these materials insofar as they inherit the desirable properties of the polymers referred to above are considered another scope of my invention.

As pointed out above the polymeric organic substances employed in my invention of an elastomeric plastic or resin type both synthetic and natural are used in the form of an aqueous dispersion as a suspension or emulsion of which there are a large number available of various types commercially under various trade names.

As an example and for illustrative purposes only, a number of polyvinyl acetate emulsions under various trade names have been found satisfactory for my invention. These are prepared generally by polymerization of the monomer in the presence of water containing an emulsifying agent generally of a colloid character (such as gum arabic, starch, agar agar, gelatin, methyl cellulose, soaps and the like); a catalyst (such as benzoyl peroxide, hydrogen peroxide and the like); and minor amounts of a surface active agent and partially hydrolyzed polyvinyl acetate and modifying agents. The final emulsion may have, for example, from about 50 to 60 percent solids of about 1 to 5 microns diameter (more or less) and generally of high viscosity but which may be handled by pouring, and may be readily mixed with the impression mixture after adding the water thereto as described above using about 1 to about 10 percent as found suitable of the emulsion (i.e., about 0.5 to 5 percent of the suspended material) as well as to the cast mixture.

The techniques of emulsification of various types of organic polymeric substances may vary somewhat from that illustrated but in general they are widely established on a commercial basis; and in fact emulsion polymerization is a standard technique of the process of polymerization itself, for example, in the case of polyvinyl acetate described as well as other synthetic resins such as polyvinyl chloride, vinylchloride-acrylate copolymer and the acrylic and other resins and others referred to herein, and the various synthetic rubbers such as the styrene-butadiene, styrene acrylonitrile, silicone rubbers, polyhydrocarbons and others referred to above. All of these are suitable in connection with my invention. In view of the above the methods by which the emulsions are produced are not a part of my invention and their detailed description is not necessary in connection therewith. It may be mentioned however that aside from producing the polymers in the form of an emulsion they may be dispersed in many cases directly in the aqueous medium containing a protective colloid or emulsifying agent by subdividing and agitation using suitable means, such as homogenizers, colloid mills, and the like. While I prefer the use of the organic polymeric materials referred to in the form of solids dispersed solids or semisolids, in some cases I may employ them in the form of highly viscous liquids when also available in the latter form emulsified in an aqueous medium. For example, polyisobutylene is available in all three forms, i.e., solid, semisolid, and viscous liquid. Similarly fluorocarbon polymers and silicones may be obtained in the form of highly viscous liquids dispersed as emulsions and in addition as finely divided semisolids and solids for example the silicone rubbers may be obtained in the latter form.

The emulsions of organic polymeric substance may also have dispersed therein various plasticizers which change and in many cases improve the characteristics of the dispersed materials. There are a very large number of these substances which are suitable and which may be illustrated by a few types such as the phthalate plasticizers of which there are many types an example of which is dibutyl phthalate, the phosphate plasticizers exemplified by triphenyl phosphate, tricresyl phosphate, cresyl diphenyl phosphate, the alkyl aryl phosphates, etc., the glycolates, the sulfonamides and many other types and individual members.

It is particularly emphasized that any of the materials named which have objectionable odor and/or color in the amounts used may be ruled out in practice since those selected are generally in suitable form as desired for use in accordance with my invention.

Among classes of materials other than the organic polymeric materials referred to which I have found useful in improving the surfaces of impressions and the models made therefrom is the use of emulsions of high-melting point waxes. These would include the high-melting point paraffin or microcrystaline wax, and hard vegetable waxes such as candallila and carnauba, bayberry beeswax, spermaceti Chinese wax, Japan wax and the like, or mixtures of the same. Broadly speaking a wax is defined as a fatty acid ester of an alcohol other than a fat and on this basis many synthetic high molecular waxes have been synthetically produced and sold under various trade names. The wax is to be used including both natural and synthetic are semisolid to solid substances. The principal esters occurring in waxes are cetyl palmitate in sperm oil; ceryl palmitate in opium wax, ceryl cerotate in Chinese wax and mellissyl palmitate in beeswax. The waxes in emulsified form may be added in relatively small amounts as preferred, e.g., 0.5 to 2 percent more or less for example in combination with the emulsions or organic polymeric substance to be used in connection with my invention either for the impression or the cast; or the wax emulsions may be used separately. In the latter case the amounts used are about the same as for the plastics and elastomers, i.e., from about 0.5 to 5 percent. The emulsions of waxes in an aqueous medium may be prepared employing the same types of emulsifying agents as described in connection with the polymeric organic elastomers, plastics and the like with variations. For example a satisfactory candellila wax emulsion with about 20 percent of wax and about 75 percent water may be prepared with 1.5 percent morpholine and a small amount of oleic acid.

In specific examples using the waxes above as additives employing emulsions of (a) paraffin wax, (b) bayberry wax, (c) carnauba wax, (d) beeswax, all containing about 20 percent of wax and adding from 0.5 to 5 percent of each separately to the (1) impression mixture and (2) dental stone mixture; showed marked surface improvement in the models or casts. Optimum results were obtained in the range of 1 to 2 percent of the suspended waxes. The other waxes named above also showed good results in this range.

In still another aspect of my invention I may obtain improved surfaces with both the impressions and models in addition to the other aspects or separately therefrom to produce a smooth hard surface by the addition of about 0.5 to about 2 percent more or less of the water insoluble alkaline earth and other metal soaps; e.g., those of magnesium as well as those of aluminum and zinc, of the high molecular weight fatty acids such as those of lauric, palmitates, stearic, myristic and the like for example, aluminum and zinc palmitates, calcium and zinc stearates and the like products the desired effect. The amounts used should be chosen to produce a smooth mixture with the other ingredients of the impression or stone compositions and the added water in either case.

Having shown at some length the types of materials I may employ as additives in the form of aqueous suspensions and emulsions namely as emphasized embracing the organic polymeric materials preferably of an elastomeric type especially for the impressions but also including those of a plastic character as described above I shall proceed first to show examples with regard to the impression mixtures and then with the preparation of the plaster cast or model (both of which have already been explained without the use of the additives) referred to above.

As stated and described previously in connection with impression material which includes the range of proportions of materials shown in the table: water is added to the impression mixture generally at room temperatures and mixing continued to the consistency of a somewhat heavy, smooth, creamy, pastelike material. Spatulation of the wet mixture which must be thorough may take place for about ½ to 1 minute at which stage the mixture is normally transferred to the tray to be applied to the mouth. With my improvement the suspension or emulsion in water of organic polymeric material is added to the mixture in the mixing bowl during the course of mixing and spatulation, and the latter is continued with the added emulsion up to about a minute and a half (or longer if desired if there is no indication of setting) and the mixture which has a normal appearance generally is then transferred to the tray to be applied to the mouth and proceeding to take the impression. Normally the time consumed for the later is from 1.5 to 3 minutes with a total time for the operation of 4 to 6 minutes. Time factors will vary dependent on variables of temperature, composition of the mixture and amount of emulsion added increasing with the latter.

The proportion of water used with the impression mixture is about 2.5 parts of water by weight for each part of impression mixture in the form of a finely divided powder although exact proportions may vary with different mixtures. For convenience the latter is measured by volume by means of a special scoop which has been standardized on the above weight basis and the container for the water to be added is likewise marked on a unit volume basis to maintain the required proportions, for example, of 1 scoop to 1 volume of water.

The amount of the emulsion to be added may likewise be standardized and this may be readily done for each composition of impression mixture and type of emulsion or suspension as well as the amount of the latter and the ultimate variable generally being the time of setting.

The tests shown in tale A are intended to illustrate in some detail the effect particularly on the time of the addition of various amounts of emulsion of a preferred type of an aqueous suspension (polyvinylacetate) of a highly dispersed plastic material in the present case polyvinyl acetate. The resultant additions between 2 and 6 percent (about 1 and 3 percent of suspended matter) of the emulsion were excellent both from the viewpoint of time of setting as well as the product.

Similar tests to those made above were made with several different alginate-calcium sulfate impression mixtures of the general composition shown in the table with the range of content of the various components as illustrated each containing a fluoride of the type discussed above. The emulsions or lattices used in this series varied but were in general (Nos. 1–6) representative of synthetic rubber; and included one natural rubber latex. All were commercial products.

TABLE A

Specific examples: Addition of emulsions to impression mixtures [1]

| Test No. | Type of emulsion [2] | Percent solids in emulsion | (a) Wt. of H2O added, gms. | (b) Wt. of impression mixture, gms. | (c) percent by wt. of emulsion added, percent | Time of setting after mixing, min. | Total time of mixing and setting, min. |
|---|---|---|---|---|---|---|---|
| 1 | Polyvinyl acetate (PVA) | 55 | 37.5 | 14.6 | 9 | 6 | 8 |
| 2 | do | 55 | 37.5 | 14.6 | 8 | 5 | 7 |
| 3 | do | 55 | 37.5 | 14.6 | 6 | 4 | 6 |
| 4 | do | 55 | [3] 36.0 | 14.6 | 6 | 3 | 5.5 |
| 5 | do | 55 | 37.5 | 14.6 | 4 | 3.5 | 5.5 |
| 6 | do | 55 | 37.5 | 14.6 | 2 | 3.0 | 5 |
| 7 | do | 55 | 37.5 | 14.6 | 0.0 | 3.0 | 5 |

[1] The impression mixture used in this series was of the type illustrated above.
[2] Several types of PVA emulsions all suitable including the one shown are available commercially. These were likewise tested with similar results to the above.
[3] (a) and (b) weights of standard volume and "scoop" used in practice. (c) The number of grams added is approximately one-half the percentages shown.

Remarks: The results with the impression, separation of the cast or model and especially the improvement in the smoothness and hardness and non-chalkiness of the surface and precision of the model were superior. The operating procedure and results were good and gave no difficulty.

TABLE B

| Test No. | Type of latex or emulsion [1] | Percent solids, (approx.) | Percent by weight [2 3] |
|---|---|---|---|
| 1 | Acrylonitrile polymer | 50 | 2 |
| 2 | do | 40 | 4 |
| 3 | Styrene-butadiene copolymer | 60 | 2 |
| 4 | do | 50 | 3 |
| 5 | do | 40 | 4-5 |
| 6 | Butadiene-acrylonitrile copolymer | 50 | 3 |
| 7 | Natural rubber latex | 35 | 4 |
| 8 | Polyacrylic ester resin | 45 | 4 |

[1] All of the types used are available commercially.
[2] Of emulsion or latex added to standard alginate type impression mixture containing when used about 37.5 gms. H2O and 14.6 gms. of impression mixture.
[3] The standard alginate-calcium sulphate type of impression mixture as described and shown in Table 1.

SPECIAL NOTE: The time of mixing in all cases varied between about 1½ and 2 minutes.

Remarks: The results in each case and the total time including setting varied between about 0 and 6.5 minutes, were comparable to those shown in TableA of the specific examples, the impression being flexible and precise, the cast or model being readily removed and having very smooth and non-chalky surfaces definitely superior to comparable casts without the addition emulsions.

In addition to the lattices or emulsions shown in tables A and B which illustrate certain principles there are a large number of others which gave good results when used in comparable proportions and amounts and in all cases the products are superior in respect of both impression and casts or models to those where no emulsion or latex is added. Examples of these mainly of a synthetic resin character are emulsions or suspensions generally of polyvinylchloride, polymerized acrylic and methacrylic esters, polyvinyl chloride-acrylic ester copolymer, vinylchloride-vinylidene chloride copolymers and various modifications of the foregoing. Additionally I may employ specific polymerized hydrocarbons of elastomeric properties, e.g., polyethylene, polyisobutenes, and synthetic rubber types in this category including polyisoprene, polybutadiene and the copolymer of isobutene with butadiene as well as particularly the polymers of tetrafluoroethylene and copolymers of the latter with hexafluoroethylene. Of particular interest in this connection are the specific examples wherein dispersions or emulsions of polydimethylsiloxane in the group of silicones as well as examples of emulsions of the fluorocarbon (or Teflon) polymers.

Table II shows these and other elastomeric and plastic substances which when used in emulsified form, that is as a suspension in an aqueous medium, and added in the proportions shown (generally within the range about 1 to 10 percent of the aqueous suspension and within the range of 0.5 to 5 percent of the suspended materials) and added to either the impression mixture (and water) and the dental stone-water mixture (or both) will improve the same as described.

The data for both the impression mixture and the dental stone mixture are shown in table III. A detailed discussion of dental stone and the manner in which it is used generally at present as well as in connection with my improvement is shown below.

TABLE II.—IMPRESSION MIXTURES

| Group | Test No.; type of polymer, elastomer, plastic, etc., to be added as aqueous suspension | Approx. percent of "solids" in suspension | Wt. of H2O added, gms. | Wt. of imp. mxt., gms. | Percent by wt. of aqueous suspension |
|---|---|---|---|---|---|
| (A) | Synthetic rubber group: | | | | |
| | 1. Polyisoprene | 50 | 37.3 | 14.6 | 3.0 |
| | 2. Polyacrylonitrile | 40 | 37.3 | 14.6 | 3.5 |
| | 3. Copolymer styrene-butadiene | 60 | 37.3 | 14.6 | 3.5 |
| | 4. Copolymer butadiene-acrylonitrile | 50 | 37.3 | 14.6 | 3.5 |
| | 5. Polybutadiene | 45 | 37.3 | 14.6 | 4.0 |
| | 6. Natural rubber latex | 35 | 37.3 | 14.6 | 4.0 |
| (B) | Polyhydrocarbon group: | | | | |
| | 1. Polyethylene | 40 | 37.3 | 14.6 | 3.5 |
| | 2. Polyisobutylene [1] | 50 | 37.3 | 14.6 | 4.0 |
| (C) | Synthetic resin group (plastics and elastoplastics): | | | | |
| | 1. Polyvinyl acetate | 55 | 37.3 | 14.6 | 3.5 |
| | 2. Polyvinyl chloride | 50 | 37.3 | 14.6 | 3.0 |
| | 3. Copolymer vinylacetate-vinylchloride | 40 | 37.3 | 14.6 | 4.0 |
| | 4. Copolymer vinylchloride-acrylic ester | 45 | 37.3 | 14.6 | 3.5 |
| | 5. Copolymer vinylchloride-vinylidene chloride | 40 | 37.3 | 14.6 | 3.0 |
| | 6. Polyvinylidene chloride | 50 | 37.3 | 14.6 | 3.0 |
| | 7a. Polyacrylic ester resin [2] | 50 | 37.3 | 14.6 | 3.5 |
| | 7b. Polymethacrylic ester resin [2] | 50 | 37.3 | 14.6 | 4.0 |
| | 8. Polyvinyl butyral | 40 | 37.3 | 14.6 | 3.0 |
| (D) | Fluorocarbons and silicones: | | | | |
| | 1a. Polytetrafluoroethylene | 35 | 37.3 | 14.6 | 4.0 |
| | 1b. Copolymer polytetrafluoroethylene with hexafluoropropylene | 35 | 37.3 | 14.6 | 4.0 |
| | 2. Polydimethyl siloxane [1] (orgnao-polysiloxanes) | 35 | 37.3 | 14.6 | 4.0 |
| (E) | Alkyd resins [3]: | | | | |
| | 1a. Phthalic acid-glycerol-linoleic acid condensate | 50 | 37.3 | 14.6 | 3.5 |
| | 1b. Phthalic acid-glycerol-linoleic acid condensate [4] | 45 | 37.3 | 14.6 | 4.0 |
| | 2a. Maleic anhydride (adduct)-glycerol-linoleic acid condensate [5] | 45 | 37.3 | 14.6 | 2.5 |
| | 2b. Maleic anhydride (adduct)-glycerol-linoleic acid condensate [6] | 50 | 37.3 | 14.6 | 2.5 |
| (F) | Plastics from cellulose [3]: | | | | |
| | 1a. Cellulose acetate | 30 | 37.3 | 14.6 | 3.5 |
| | 1b. Cellulose acetate butyrate | 30 | 37.3 | 14.6 | 3.5 |
| | 1c. Cellulose acetate propionate | 30 | 37.3 | 14.6 | 3.5 |

TABLE II.—DENTAL STONE MIXTURES

| Group | Test No.; type of polymer, elastomer, plastic, etc., to be added as aqueous suspension | Approx. percent of "solids" in suspension | Wt. of H₂O added, gms. | Wt. of dental stone, gms. | Percent by wt. of aqueous suspension |
|---|---|---|---|---|---|
| (A) | Synthetic rubber group: | | | | |
| | 1. Polyisoprene | 50 | 23.0 | 75.0 | 4.0 |
| | 2. Polyacrylonitrile | 40 | 23.0 | 75.0 | 3.5 |
| | 3. Copolymer styrene-butadiene | 50 | 23.0 | 75.0 | 4.0 |
| | 4. Copolymer butadiene-acrylonitrile | 50 | 23.0 | 75.0 | 3.5 |
| | 5. Polyisobutadiene | 45 | 23.0 | 75.0 | 4.0 |
| | 6. Natural rubber latex | 35 | 23.0 | 75.0 | 4.5 |
| (B) | Polyhydrocarbon group: | | | | |
| | 1. Polyethylene | 40 | 23.0 | 75.0 | 3.5 |
| | 2. Polyisobutylene [1] | 50 | 23.0 | 75.0 | 4.5 |
| (C) | Synthetic resin group (plastics and elastoplastics): | | | | |
| | 1. Polyvinyl acetate | 55 | 23.0 | 75.0 | 4.5 |
| | 2. Polyvinyl chloride | 50 | 23.0 | 75.0 | 4.0 |
| | 3. Copolymer vinylacetate-vinylchloride | 40 | 23.0 | 75.0 | 4.0 |
| | 4. Copolymer vinylchloride-acrylic ester | 45 | 23.0 | 75.0 | 3.5 |
| | 5. Copolymer vinylchloride-vinylidene chloride | 40 | 23.0 | 75.0 | 3.5 |
| | 6. Polyvinylidene chloride | 50 | 23.0 | 75.0 | 4.0 |
| | 7a. Polyacrylic ester resin [2] | 50 | 23.0 | 75.0 | 4.0 |
| | 7b. Polymethacrylic ester resin [2] | 50 | 23.0 | 75.0 | 4.5 |
| | 8. Polyvinyl butyral | 40 | 23.0 | 75.0 | 4.0 |
| (D) | Fluorocarbons and silicones: | | | | |
| | 1a. Polytetrafluoroethylene | 35 | 23.0 | 75.0 | 4.0 |
| | 1b. Copolymer polytetrafluoroethylene with hexafluoropropylene | 35 | 23.0 | 75.0 | 4.0 |
| | 2. Polydimethyl siloxane [1] (organo-polysiloxanes) | 35 | 23.0 | 75.0 | 4.0 |
| (E) | Alkyd resins [3]: | | | | |
| | 1a. Phthalic acid-glycerol-linoleic acid condensate | 50 | 23.0 | 75.0 | 4.5 |
| | 1b. Phthalic acid-glycerol-linoleic acid condensate [4] | 45 | 23.0 | 75.0 | 4.0 |
| | 2a. Maleic anhydride (adduct)-glycerol-linoleic acid condensate [5] | 45 | 23.0 | 75.0 | 3.5 |
| | 2b. Maleic anhydride (adduct)-glycerol-linoleic acid condensate [6] | 50 | 23.0 | 75.0 | 3.5 |
| (F) | Plastics from cellulose [3]: | | | | |
| | 1a. Cellulose acetate | 30 | 23.0 | 75.0 | 4.5 |
| | 1b. Cellulose acetate butyrate | 30 | 23.0 | 75.0 | 4.5 |
| | 1c. Cellulose acetate proprionate | 30 | 23.0 | 75.0 | 4.5 |

[1] Viscous liquids.
[2] Polymers of alkyl esters of acrylic and methacrylic acids.
[3] The alkyd polyester resins and plastics are used in the form of an aqueous emulsion of these materials dissolved in suitable organic liquid solvents.
[4] Modified with vegetable drying oil.
[5] Maleic anhydride (adduct) with dipentene.
[6] Maleic anhydride (adduct) with cyclopentadiene.

Remarks: The impression mixture referred to in this series was the standard alginate-calcium sulfate type illustrated in Table I above. The weights of impression mixture and water used in connection therewith are those of the standard "scoop" and volume used in practice; likewise, the standard practice of measuring the dental stone and water for these mixtures may be used. In practically all cases, the weights of the aqueous suspension or emulsion correspond closely enough to that of water to enable measurement by volume as a matter of convenience in practice. In all cases, the total time of mixing and setting for the impression mixtures could be regulated to be within the practical limits of about 5 to about 6 minutes. The setting time for the dental stone mixtures is less critical but, in all cases, remained within practical limits.

The impressions with the additives (especially where the polymers have elastomeric properties) are noticeably more flexible; and in all cases with the use of the additives, they are more precise and the cast or model may be readily removed. Moreover, when compared with the standard, either with the naked eye or a medium power magnifying glass (or microscope), the surfaces of the casts or models (where the additives are used either to the impression mixture or to the stone mixture) have very smooth, somewhat glossy and non-chalky surfaces definitely superior to comparable casts made without the additive emulsions or suspensions.

The term "solids" as used in the headings refers to suspended additives in the aqueous medium whether they are in liquid, semi-solid or solid form.

With regard to certain other aspects of the data in table II, it has been found convenient to employ the polyisobutylene and polydimethylsiloxane (silicone) in the form of emulsions of very viscous liquids in which form they are readily obtainable as well as in semisolid and solid form as elastomers. The latter are sometimes referred to as rubbers. The emulsion of polydimethylsiloxane (viscosity of the latter material in liquid form—about 100,000 centistokes) is obtainable commercially; the emulsion of the viscous isobutylene liquid may be made by conventional methods described herein.

The substances named in sections E and F in table II namely the alkyd polyester resins and the cellulose plastics are also employed as suspensions in an aqueous medium, most conveniently used in the form of an emulsion of those substances by dissolving them first in a water insoluble organic liquid solvent and emulsifying the latter by conventional methods. Latexes of the alkyd polyester resins, e.g., in a hydrocarbon or other suitable solvent are employed in this manner. The "alkyd" resins are sometimes modified with vegetable drying oils to render them more plastic. The cellulosic plastics are soluble in a wide variety of organic liquid solvents, namely, ketones, esters and others. The same technique may if desired be employed with other substances shown (if desired as a matter of convenience), but is generally unnecessary in most cases.

In the case of the maleic acid anhydride derivatives, the latter is usually reacted first with a diolefin such as dipentene or cyclopentadiene to form the adduct which is reacted with the other materials shown in 2a and 2b.

It is noted in passing that the polymer substances may be used with and without plasticizers among the latter being dioctyl phthalate, tricresyl phosphate, alkyl aryl phosphate, acetyl tributyl citrate and various glycols like propylene glycol and hexylene glycol. Also as noted small additions of the emulsions or suspensions of waxes, gums and water insoluble metal soaps to the emulsions of polymeric organic materials of the types referred to above may also be added using about 3 to 10 parts per 100 parts of latex solids with good results for special purposes in the case of both the impression materials and the casts. As pointed out above these substances used in small amounts (in the range of about 0.5 to about 5 percent) may also be added without the emulsions of elastomers, plastic, etc. The metal soaps are especially useful as an additive in making the dental stone plaster casts.

It is to be emphasized that the various types of emulsions referred to are in most cases compatible with each other. Also the other additives, e.g., such as candellila, carnauba, paraffin emulsion waxes, etc. and related natural resins or derivatives, e.g., resin ester emulsions and various thickening agents may be added in some cases within limits to impart desirable properties to the impressions and casts.

It is noted also that various emulsions may be in some cases incompatible especially where the emulsifying and stabilizing agents may not be compatible with each other, but this may be readily determined by simple test. Stability of the emulsion may also be affected by temperature conditions or freezing and the presence of adverse reagents which generally are not present in either the impression mixture or in the plaster or "-stone." In the preparation of some of the emulsions or dispersions which may not be readily obtainable commercially generally mechanical stirring followed by high shear mills such as homogenizers, colloid mills and the like may be used and surfactants to wet the particles and prevent reagglomeration are required in addition to emulsifying agents referred to. Both of these are well known in the art.

Details of the use of the organic polymeric additives (and the other related substances) have been described above in connection with the impression mixtures to obtain certain desirable results in the plaster cast or model made with the impression. The data in table II as well as descriptive matter regarding all additives discussed herein relate to both the impression mixtures and the dental stone mixtures, but it is considered desirable to include a more detailed discussion of dental stone and the manner in which the additives are used in connection therewith.

The principal objective of my invention is to obtain a cast or model which may be readily separated and is of greater precision and the surfaces of which are very smooth, nonchalky and relatively hard; when compared to casts or models made without these additives. In the other important aspect of my invention referred to above (including extensive data in table II) and described below in greater detail the objective is the same, but it is achieved by adding the same organic polymeric and related substances discussed at great length above to the plaster or "stone" employed in making the cast or model. Thus the additives may be used either with the impression mixture, the dental stone or both and it is emphasized that the additives are employed in all cases by the dentist, etc., at the time when the impression and cast are being prepared.

As pointed out above normally after the dental impressions are made under suitable conditions as described and in general well known, a plaster cast or model is produced from the impression by filling the same according to the well known and established techniques. The "plaster" material from which the cast is made is known to the trade and the profession as dental "stone" and generally is a form of plaster of Paris. The latter is obtained by heating gypsum the natural calcium sulfate (dihydrate ($CaSO_4 \cdot 2H_2O$)) at a temperature of 120° to 130° C. until about three-quarters of the water of hydration is removed. The resulting hemihydrate $CaSO_4 \cdot \frac{1}{2} H_2O$ is plaster of Paris. When mixed with the appropriate amount of water the latter recombines and sets into a hard mass which in the present case becomes the "stone" cast or model. This is a simplified version as the detailed chemistry of setting involves many intermediate forms from the viewpoint of both the crystal structure as well as the degree of hydration and the types of hemihydrate but in any event there are a number of well known dental "stones" under a variety of trade names. Dental stone generally may be considered a variety of plaster of Paris specially prepared for the purpose for which it is used and the dentist or technician chooses the "brand" or type which appears to best serve his purpose and the product is referred to generally as "stone," although it is in finely divided form.

The cast is made within a short time after the impression. Generally the amount of water used for mixing with the dental stone (which is always in powdered form) to obtain a mixture of satisfactory consistency is between 2.8 to 3.4 parts of the stone by weight to 1 part of water. One general formula given for a commercial product is 100 g. of stone to 30 cc. (or g.) of water (1:3.3). The consistency of the latter is fairly stiff but may be vibrated into the impression. Ratios of 1 of water to 3 of stone are generally satisfactory and since the apparent density of the powdered "stone" is about the same as the true density of water volume measurements may be substituted for weight as a matter of convenience thus permitting the regular measuring devices to be used without weighing. In any event the ratios for the various commercial stones may be determined by simple trial for the consistency desired.

The addition of the emulsions of any of the organic polymeric substances and related substances is referred to in all of the foregoing and more particularly in connection with the specific examples shown for the impression mixtures as additives to the dental "stone" and water mixtures and may be readily accomplished by preparing relatively stiff mixtures of the water and stone and adding the emulsion or dispersion of the organic polymeric or elastomeric or plastic material to the stiff mixture in the mixing bowl, and spatulation is continued. The time for mixing of the stone and water is not as critical as with the impression mixtures because the latter set up much more rapidly, and therefore more time may be allotted to this operation although it may be carried out quite rapidly.

The amounts of the emulsion or aqueous dispersion generally of the organic polymeric material added to the water "stone" mixture may be of the same order as that shown for the impressions. In both cases the amounts used may be from about 1 to 10 percent of the emulsion (about 0.5 to 5 percent of the dispersed or suspended solids the larger the volume (and weight) of the emulsion the longer the time within certain limits for setting. However, this can be controlled within limits by reducing the water proportion to compensate for that in the emulsion. However, in the case of the impressions due to limitations of setting time (as a matter of convenience while in the patient's mouth) preferred ranges are from about 1 to 5 percent of the emulsion and the same ranges from 1 to 5 percent have been found to give very satisfactory results with the water-stone mixture for making the casts or models with the higher percentages of suspended matter.

The specific gravity of the emulsions generally are close enough to that of water so that the amount of water added with the emulsion may be subtracted from that required by the mixture although as a matter of practice this is not required.

As one specific example regarding the details of the use of a polymeric organic material added to dental stone to improve the model or cast employing, a polyvinylacetate emulsion as in table A for the impression the total weight of the commercial stone used in connection with the preparation of a model could be about 65 g. to about 75 g. and the amount of water to give the proper consistency from about 20 g. to 23 g. On the basis of 75 g. dental stone and 23 cc. of water a total of 98 g. and employing 4 percent of PVA emulsion, i.e., 4 g. or in general about 4 cc. and mixing the latter by spatulation with the mixture of dental stone and water (in the usual rubber or plastic mixing bowl) produces a mixture ready for the impression. It is of course to be understood that proportions of water and stone may be adjusted for desired consistency. The remaining procedure, in fact all of the foregoing procedure with the exception of the addition of the emulsion is practically the same as the usual procedure. The cast normally takes about 15 to 20 minutes which is the usual time to harden and set ready for removal. There may be a somewhat longer period required when the emulsion is used especially where larger amounts are used but this is not as important as in the case of the impression mixtures and may be compensated for largely by adding less water in the first place for example for about 10 percent of the emulsion with 5 percent solids the water may be reduced for the example between 20 and 23 cc. in the example shown to around the lower figure.

The cast or model product resulting from the above test was greatly improved over that in which no emulsion was used with the dental stone mixture. The model was readily separated as with the examples shown for the impression mixtures. The surface of the cast or model was hard and unusually smooth and nonchalky both in appearance and to the touch and were superior in these respects as well as precision of cast.

Additional tests were made (as in table A for the impression mixtures) using varying proportions of emulsions of from 1 to 6 percent all within practical setting times with similar results with regard to quality of cast or model as described. Higher percentages, e.g., 8 to 10 percent also gave good results with prolonged setting times but reduction in water as described above compensated for this to a considerable degree especially where the solid content of the emulsion is relatively low. However the preferred range of about 0.5 to 5 percent in most cases is satisfactory although I do not contemplate limiting myself therein.

It is emphasized that in these and the succeeding examples the emulsion was not added at the same time to the impression mixture also. In this connection I contemplate as included within the scope of my invention the addition of the emulsion or suspension of organic polymeric material (a) only to the impression mixture as described, of (b) only to the dental stone-water mixture as described, or (c) to both the impression mixture and the dental stone-water mixture as described for each.

A series of tests was made as in table B in which mixtures of water and dental stone (varying from about 2.8 to about 4.2 parts of dental stone to 1 part of water and generally in the range of 3 to 4 parts of the stone to 1 of water were used. The lattices or emulsions of polymeric organic materials added shown below are in the range of about 1 to about 5 percent by weight of the following although higher percentages, e.g., up to about 10 percent could be used with good results. Those tested were as follows: (a) acrylonitrile, (b) styrene-butadiene (with solid contents of 60, 50 and 40 percent), (c) modified butadiene acrylonitrile, and (d) natural rubber latex. Aside from the natural rubber the foregoing named in this section are elastomers referred to as synthetic rubbers.

All of the organic polymeric compounds mentioned above in connection with the impression mixtures may also be used in connection with the dental stone mixtures and these are summed up generally in table II. The technique of testing was as described above, namely to mix the dental stone and water in the proportions shown, generally adding the water to the maximum consistency which would allow working the emulsion or latex by spatulation or after the addition of all the water regulated so that the proper consistency is obtained when all of the components are mixed. The use of the undiluted latex is preferred and the water requirement may if desired take into account the water content of the latex or emulsion. Also it may be found desirable to dilute the latex or emulsion with part of the water requirement before adding to the dental stone. The same techniques may be employed in connection with the impression mixtures although direct addition is satisfactory.

The addition of plasticizers of the type named above (which comprises a large group) in connection with the preparation of the dental impression mixtures may also be used in connection with the dental stone mixtures and in the same general proportions which in general is a small proportion of the emulsion. Normally when used they are mixed in with the emulsions or dispersions generally and the resulting mixture used as described for the emulsions above.

The waxes, of the types named above may be used directly with the dental stone water mixtures as suspensions in water employing the same types of emulsifying or suspending agents referred to in connection with the preparation of the emulsions with surfactants as found desirable and working into the dental stone water mixtures generally of heavy creamy consistency by spatulation. The waxes may be used alone or separately if desired with the dental stone water mixture but generally they are used in a proportion of from 3 to 10 parts per 100 of the latex or emulsion solids when used with the latter. When used alone with the dental stone mixture the range of weights the additives are within that shown for the emulsion of organic polymers.

As pointed out also in connection with the impression mixture there are many materials which form compatible mixtures with the organic polymer substances, e.g., the wax suspensions already referred to and other substances like the resin ester emulsions, and various thickening agents such as starches, hydroethyl cellulose, methyl cellulose, polyvinyl alcohol, casein dispersions and the alginates already referred to in the impression mixtures which are compatible and may be mixed with the organic polymeric material referred to above.

The surfaces of the models and casts from all of the specific examples as stated above were in all cases superior and stronger than those obtained without the use of the emulsified or dispersed organic substances and in all cases were smoother and nonchalky and as a consequence of greater precision. These qualities are so pronounced that they are observable both with the naked eye and the touch, especially smoothness and nonchalkiness as well as with a magnifying glass.

It is to be understood that while the proportions shown above for water and various dental stones are satisfactory within the limits shown, there are a group of variables, namely the consistency of the mixture preferred by the operator in making the cast and to some extent the type of dental stones used of which there are a number of satisfactory products (those tested, e.g., included alba-stone, castone, coecal, vel mix and others). The limits of consistency are on the one hand a paste fluid enough to be vibrated in the crevices of the impression but stiff enough to remain in place and not to unduly prolong the time of setting. The type of emulsion and solids content is also a factor in working the same into the dental stone-water mixture without too great loosening of the same. Therefore, to this extent I am not bound by the proportions shown. However, it is emphasized that all of these factors may be readily determined and worked out very simply by brief "trial and error" to obtain precisely the conditions and product desired by the operator.

While I have emphasized the use of the alginate-calcium sulfate type of impression mixtures in my invention it has been recognized that for special impression work, rubber or elastomer compositions and plastics or resins and similar materials as such and various combinations may be employed to make impressions: and also for some types of dental prosthetic uses these materials are superior on a selective basis and have many applications. I intend therefore to employ my special dental stone compositions described above to make casts and models where applicable in connection with such impressions as well as from alginate compositions and in fact it is within the scope of my invention to employ my special dental stone compositions for making casts generally although they find special application in connection with their use in dental impressions.

Also in the manufacture of porcelain teeth it is common practice to carve the desired shapes and sizes out of plaster of Paris after which metal molds are made from those carved models and the product of my invention is useful in this application as well as in molding operations generally as the product is less liable to chip and crack than ordinary plaster.

The expression organic polymer or polymeric organic material as defined in the claims (in addition to definitions already given herein) refer to the chemical combination of like or unlike organic compounds to form higher molecular weight compounds by polymerization, copolymerization and interpolymerization reactions, as well as for compounds of similar properties by condensation reactions. The last-named group is among those shown in the classification and therefore form an important segment of the classes of materials used by me in connection with my invention. The liquid and more particularly the semisolid, and solid polymer compounds thus formed are of high to very high molecular weights in ascending order ranging from heavy viscous liquids through semisolids to solids. Rubbers are distinguished from elastomers generally by the ability to be vulcanized or cured and may include synthetic as well as natural rubbers. It is noted that many of the substances shown above and used by me appear on the market under various trade names and their use is included herein. Also as previously pointed out there are intermediate materials between elastomers and plastics which I have referred to as elastoplastics. Also some of the materials claimed by me give superior results and are therefore preferred although the others are satisfactory and within the scope of my invention.

In the above description I have used the expressions emulsions and latexes (plural for latex) sometimes referred to as lattices and suspensions and dispersions to designate the form in which the additive materials which I employ are used in an aqueous medium. These terms are used generally in the present connection in the same sense as in the terminology of colloid chemistry, however with some modification based on trade usage in connection with their manufacture and sale. Normally the term emulsion applies to a two phase system in which both the internal and external phases are liquids for example an oil in water emulsion in which oil is the internal phase. However since there is no fixed demarcation between heavy liquids and semisolids (or between the latter and solids) and the commercial products employed by me as described above are referred to as emulsions and lattices this terminology will be used herein. One basis for this usage is that while the dispersed or internal phase may not necessarily be true liquid the particles are generally in spherical form indicating that they are or have passed through a liquid stage; and that they are in general of colloid dimensions. The term latex is used interchangeably with emulsion.

On the same basis the term suspension is applied to a two phase system in which the internal phase is a finely divided solid in a liquid external phase but this term may also be applied broadly to emulsions since they are in the academic sense suspensions of liquids in liquids. The term dispersion applies in general to both types of systems discussed above in which the dispersed particles are discrete and may be seen under a medium to high power microscope. Strictly a solution is a molecular dispersion and for present purposes it is excluded from the above definitions. The same is true for the intermediate cases of such materials as starches and gelatin which while not in true solution are in a state of colloidal solution or dispersion, the molecules of which are longer than those in true solution but cannot be seen with an ordinary microscope, and do not represent a dispersion of discrete particles such as the emulsions and suspensions employed by me.

Certain substances which may be employed by me such as waxes as well as the metallic soaps which may not be in the class of polymeric organic substances, may be nevertheless referred to herein as dispersions or suspensions of organic substances. The substances for the most part are in general of a nonfluid character although the aqueous suspensions are fluid. The wax dispersions are likewise sometimes referred to as emulsions.

Most of the dispersions used by me may vary in size from about 0.1 micron to 5 micron and upward and in general show brownian movement and may be viewed with a medium to high power microscope, but I am not limited thereby.

The terms alginate or alginate-calcium sulfate dental impression composition as used in the claims refer to compositions as shown in table I as well as similar compositions; and the term dental stone composition as used in the claims refers to those of plaster of Paris type also described above.

From the general physical and chemical viewpoint the expression organic substance with semisolid to solid character or properties and further no definite melting point or tendency to crystallize would cover materials of both natural and synthetic resins or rubber type as well as those polymeric substances; and these appear in the Hiatt classification of polymeric materials.

It is obvious from the above detailed description of my invention and the many but nonequivalent additives which I may employ in connection with my dental impression and dental stone materials to improve the same that there are many variables with respect to choice of additive and proportions of materials, and that I am therefore not to be limited by the foregoing examples both general and specific or in the applications and uses of the same; and that my invention is to be construed in accordance with the broad scope and spirit of the same.

I claim:

1. In processes for producing dental compositions for use in making dental impressions and for casts by preparing dental compositions containing calcium sulfate and an alginate dispersed in water as essential active ingredients and which contains in addition dispersed in said water a substantially water insoluble inert inorganic filler, said composition having the property of setting up after being formed, the improvement which consists of dispersing in said dental compositions a polymeric organic substance in the form of an aqueous suspension of the same and of the class having elastomeric and plastic properties selected from the group of elastomers consisting essentially of polyisoprene, polyacrylonitrile, copolymer of styrenebutadiene, copolymer of butadiene-acrylonitrile, polybutadiene, polyethylene, and polyisobutylene, and from the group of plastic substances consisting essentially of polyvinylacetate, polyvinylchloride, copolymer vinylacetate-vinylchloride, copolymer vinylchloride-vinylidene chloride, polyvinylidene chloride and polyvinyl butyral, which are added to the said dental compositions in the form of an aqueous suspension of the same amounts sufficient to produce about 0.5 to about 5.0 percent by weight of said polymeric organic substance based on the combined weight of the dry material and the water in said composition, and which have the property of improving the surfaces of the impressions and casts and models made therefrom and rendering the latter more precise with smoother and substantially nonchalky surfaces.

2. In processes for producing dental compositions for use in making dental impressions and for casts and models by preparing dental compositions containing calcium sulfate and an alginate dispersed in water as essential active ingredients and which contains in addition dispersed in said water a substantially water insoluble inert inorganic filler, said composition having the property of setting up after being formed, the improvement which consists of dispersing in said dental compositions a polymeric organic substance in the form of an aqueous suspension of the same and of the class having elastomeric and plastic properties is selected from the group of alkyd polyester and cellulosic plastics consisting essentially of a phthalic acid-glycerol-linoleic acid condensate, a maleic anhydride (adduct)-glycerol-linoleic acid condensate, cellulose acetate, cellulose acetate butyrate, and cellulose acetate propionate, and from the group of fluorocarbons and silicones consisting essentially of polytetrafluoroethylene, copolymer of polytetrafluoroethylene with hexafluoropropylene, and a viscous polydimethylsiloxane, which are added to the said dental compositions in the form of an aqueous suspension of the same in amounts sufficient to produce about 0.5 to about 5.0 percent by weight of said polymeric organic substance based on the combined weight of the dry material and the water in said composition, and which have the property of improving the surfaces of the impressions and casts and models made therefrom and rendering the latter more precise with smoother and substantially nonchalky surfaces.

3. In processes for producing dental compositions for use in making dental impressions and for casts and models by preparing dental compositions containing calcium sulfate and an alginate dispersed in water as essential active ingredients and which contains in addition dispersed in said water a substantially water insoluble inert inorganic filler, said composition having the property of setting up after being formed the improvement which consists of dispersing in said dental compositions a polymeric organic substance in the form of an aqueous suspension of the same which consists of a natural rubber latex which is added to the said dental compositions in the form of an aqueous suspension of the same in amounts sufficient to produce about 0.5 to about 5.0 percent by weight of said polymeric organic substance based on the combined weight of the dry material and the water to be added, and which have the property of improving the surfaces of the impressions and casts and models made therefrom and rendering the latter more precise with smoother and substantially nonchalky surfaces.

4. In processes for producing dental compositions for use in making dental impressions and for casts and models by preparing dental compositions containing calcium sulfate and an alginate dispersed in water as essential active ingredients and which contains in addition dispersed in said water a substantially water insoluble inert inorganic filler, said composition having the property of setting up after being formed, the improvement which consists of dispersing in said dental compositions of organic substance in the form of an aqueous suspension of the same which consists of a wax having plastic properties selected from the group consisting of paraffin wax, candallila wax, carnauba wax, bayberry wax, beeswax, spermaceti, Chinese and Japan wax, and semisolid to solid high molecular weight synthetic waxes, which are added to the said dental compositions in the form of an aqueous suspension of the same in amounts sufficient to produce about 0.5 percent to about 5.0 percent by weight of said organic substance based on the combined weight of the dry material and the water in said composition, and which have the property of improving the surfaces of the impressions and casts and models made therefrom and rendering the latter more precise with smoother and substantially nonchalky surfaces.

5. The process for producing a composition defined in claim 15 wherein the finely divided suspension of organic substance consists of polyvinylacetate.

6. In processes for producing dental compositions for use in making dental impressions and for casts and models by preparing dental compositions containing calcium sulfate and an alginate dispersed in water as essential active ingredients and which contains in addition dispersed in said water a substantially water insoluble inert inorganic filler, said composition having the property of setting up after being formed, the improvement which consists of dispersing in said dental compositions of polymeric organic substance in the form of an aqueous suspension of the same and of the class having elastomeric and plastic properties selected from the group of substances having plastic properties consisting essentially of a polyacrylic ester, a polymethacrylic ester and copolymer vinylchlorideacrylic ester, which are added to the said dental compositions in the form of an aqueous suspension of the same in amounts sufficient to produce about 0.5 to about 5.0 percent by weight of said polymeric organic substance based on the combined weight of the dry material and the water in said composition, and which have the property of improving the surfaces of the impressions and casts and models made therefrom and rendering the latter more precise with smoother and substantially nonchalky surfaces.

7. In processes for producing dental stone compositions for use in making casts and models from dental impressions by preparing dental compositions containing calcium sulfate dispersed in water as an essential ingredient and having the property of setting up after being formed, the improvement which consists of dispersing in said dental compositions of polymeric organic substance in the form of an aqueous suspension of the same and of the class having elastomeric and plastic properties selected from the group of elastomers consisting essentially of polyisoprene, polyacylonitrile, copolymer of styrene-butadiene, copolymer of butadiene-acrylonitrile, polybutadiene, polyethylene, and polyisobutylene, and from the group of plastic substances consisting essentially of polyvinyl acetate, polyvinylchloride, copolymer vinylacetate-vinylchloride, copolymer vinylchloride-vinylidene chloride, polyvinylidene chloride and polyvinyl butyral, which are added to the said dental compositions in the form of a suspension of the same in an aqueous medium in amounts sufficient to produce about 0.5 to about 5.0 percent by weight of said polymeric organic substance based on the combined weight of the dry material and the water in said composition and which have the property of improving the surfaces of the casts and models made therefrom and rendering the latter more precise with smoother and substantially nonchalky surfaces, and said dental compositions being further characterized by the said calcium sulfate being present in amounts of about 72 to about 80 percent.

8. In processes for producing dental stone compositions for use in making casts and models from dental impressions by preparing dental compositions containing calcium sulfate dispersed in water as an essential ingredient and having the property of setting up after being formed, the improvement which consists of dispersing in said dental compositions a polymeric organic substance in the form of an aqueous suspension of the same and of the class having elastomeric and plastic properties selected from the group of alkyd polyester and cellulosic plastics consisting essentially of a phthalic acid-glycerol-linoleic acid condensate, a maleic anhydride (adduct)-glycerol-linoleic acid condensate, cellulose acetate, cellulose acetate butyrate, and cellulose acetate propionate, and from the group of fluorocarbons and silicones consisting essentially of polytetrafluoroethylene, copolymer of polytetrafluoroethylene with hexafluoropropylene, and a viscous polydimethylsiloxane which are added to the said dental compositions in the form of a suspension of the same in an aqueous medium in amounts sufficient to produce about 0.5 to about 5.0 percent by weight of said polymeric organic substance based on the combined weight of the dry material and the water in said composition and which have the property of improving the surfaces of the casts and models made therefrom and rendering the latter more precise with smoother and substantially nonchalky surfaces, the said dental compositions being further characterized by the said calcium sulfate being present in amounts of about 72 to about 80 percent.

9. In processes for producing dental stone compositions for use in making casts and models from dental impression by preparing dental compositions containing calcium sulfate dispersed in water as an essential ingredient and having the property of setting up after being formed, the improvement which consists of dispersing in said dental compositions of polymeric organic substance in the form of an aqueous suspension of the same which consists of a natural rubber latex which is added to the said dental compositions in the form of a suspension of the same in an aqueous medium in amounts sufficient to produce about 0.5 to about 5.0 percent by weight of said polymeric organic substance based on the combined weight of the dry material and the water in said composition and which have the property of improving the surfaces of the casts and models made therefrom and rendering the latter more precise with smoother and substantially nonchalky surfaces, the said dental compositions being further characterized by the said calcium sulfate being present in amounts of about 72 to about 80 percent.

10. In processes for producing dental stone compositions for use in making casts and models from dental impressions by preparing dental compositions containing calcium sulfate dispersed in water as an essential ingredient and having the property of setting up after being formed, the improvement which consists of dispersing in said dental compositions an organic substance in the form of an aqueous suspension of the same which consists of a wax having plastic properties selected from the group consisting of paraffin wax, candallila wax, carnauba wax, bayberry wax, beeswax spermaceti, Chinese and Japan waxes, and semisolid to solid high molecular weight synthetic waxes, which are added to the said dental compositions in the form of a suspension of the same in an aqueous medium in amounts sufficient to produce about 0.5 to about 5.0 percent by weight of said organic substance based on the combined weight of the dry material and the water on said composition and which have the property of improving the surfaces of the casts and models made therefrom and rendering the latter more precise with smoother and substantially, nonchalky surfaces, the said dental compositions being further characterized by the said calcium sulfate being present in amounts of about 72 to about 80 percent.

11. The process for producing a composition defined in claim 7 wherein the finely divided suspension of organic substances consists of polyvinylacetate.

12. In processes for producing dental stone compositions for use in making casts and models from dental impressions by preparing dental compositions containing calcium sulfate dispersed in water as an essential ingredient and having the property of setting up after being formed, the improvement which consists of dispersing in said dental compositions a polymeric organic substance in the form of an aqueous suspension of the same and of the class having elastomeric and plastic properties is selected from the group of substances having plastic properties consisting essentially of a polyacrylic ester, a polymethacrylic ester and copolymer vinylchloride acrylic ester which are added to the said dental compositions in the form of a suspension of the same in an aqueous medium in amounts sufficient to produce about 0.5 to about 5.0 percent by weight of said polymeric organic substance based on the combined weight of the dry material and the water in said composition and which have the property of improving the surfaces of the casts and models made therefrom and rendering the latter more precise with smoother and substantially nonchalky surfaces, the said dental compositions being further characterized by the said calcium sulfate being present in amounts of about 72 to about 80 percent